Dec. 19, 1961   J. A. ANDERSON   3,013,760
WINDOW SHADE ROLLER AND BRACKET
Filed Sept. 19, 1957

INVENTOR.
James A. Anderson
BY
Wood, Herron & Evans.
Attorneys.

United States Patent Office 3,013,760
Patented Dec. 19, 1961

3,013,760
WINDOW SHADE ROLLER AND BRACKET
James A. Anderson, Muskegon, Mich., assignor to Breneman-Hartshorn, Inc., Cincinnati, Ohio, a corporation of Ohio
Filed Sept. 19, 1957, Ser. No. 684,936
4 Claims. (Cl. 248—267)

This invention relates to window shade rollers and brackets for supporting such rollers and is particularly directed to a novel bearing construction for rotatably supporting one end of a roller in a bracket.

A conventional window shade construction comprises a length of material which is attached at one end to a hollow roller, the roller enclosing a spring winding mechanism adapted to automatically retract, or rewind, the shade when it is to be raised. One end of the roller carries a flat spear which projects outwardly from the roller and fits into a slot formed in a suitable bracket. The other end of the roller is provided with a metal pin or gudgeon which is rotatably journalled in a second metal bracket.

One common defect with previous window shade installations of this type is that the roller produces an objectionable squeaking noise when it is raised or lowered. Additionally, at times the friction between the roller pin and its supporting bracket becomes so great that the roller spring is not effective to completely retract the shade. These defects have been magnified by recent developments in the window shade field. In the first place, the use of metal head boxes which surround the roller and protect the shade when it is rolled up, has become more widespread. Unfortunately, these head boxes serve as a sounding board to amplify the noise caused by the pin rotating in its mounting bracket. Secondly, many of the newer shade fabrics are appreciably heavier than those previously employed. Consequently, it becomes necessary to utilize the force of the roller spring most effectively in order to obtain proper retraction of the shade.

The principal object of the present invention is to provide a roller pin and bracket construction which eliminates these defects, the roller turning freely and quietly within the bracket. The attachment of this object is made more difficult by the fact that the roller pin and bracket must not only provide a pivotal support for the roller but also must resist any sideways thrust produced when the shade is pulled. Furthermore, the principal market for window shades is for those of the inexpensive variety; so that the bracket and pin cannot add appreciably to the cost of the unit. The present invention is predicated upon the concept of providing a single nylon sleeve member for covering the exposed pin surfaces and a single nylon bushing member for covering the exposed surfaces of the bracket bearing area. Consequently, all metal to metal contact is eliminated and all engaging portions of the pin and bracket have a nylon to nylon contact. The nylon sleeve and bushing thus function to provide a smooth silent pivot bearing and thrust bearing.

A preferred form of gudgeon constructed in accordance with the present invention comprises a nail portion adapted to be driven into the end of a roller. A flat head extends across the central portion of the gudgeon and separates this nail portion from an outwardly extending cylindrical pin portion. In accordance with the present invention a thin nylon sleeve having an outwardly extending flange, or lip, formed on one end thereof is press-fit over the pin, with the flange in abutment with the gudgeon head. The sleeve covers the entire length of the pin and the flange substantially covers the gudgeon head.

The bracket includes a mounting flange for securing the bracket to a wall and an outwardly extending arm having a transverse bearing opening. A nylon bushing is inserted in this opening, the nylon bushing having a cylindrical bore and an outwardly extending shoulder, or flange, formed on one end. This flange is preferably slightly larger than the gudgeon head and is adapted to engage the flange formed on the nylon sleeve forced over the gudgeon. The nylon sleeve and bushing thus provide contact over the entire rolling contact area of the bearing as well as the thrust contact area of the bearing. This nylon to nylon contact is relatively frictionless and eliminates any squeaking noise when the roller is turned.

I have determined that if either the sleeve or bushing is eliminated so that a metal to nylon bearing is formed, a definitely inferior result is obtained since after a period of use the roller will again tend to squeak when it is rotated. In all probability, this squeak is produced by small particles of metal which become entrained in the nylon bearing member and are subsequently rubbed against the metal member from which the particles were separated.

Another object of the present invention is to provide a bracket and nylon bushing construction which is readily assembled and in which the nylon bushing will not tend to rotate in use. In practice, the nylon bushing members of the present invention are formed in any suitable manner such as by ejection molding or by extruding a cylindrical piece and rolling a collar on an end thereof. Those skilled in the art will readily appreciate that it is not possible to hold the dimensions of such molded plastic parts to the same close tolerances to which metal can be worked. In order to insure that all bushings will be firmly held within the bracket against rotation, the opening in the present bracket is formed by means of a pressing punch having a plurality of spaced grooves so that the wall of the opening has a plurality of longitudinal grooves formed therein. When a nylon bushing is forced into the opening, the bushing material tends to expand into these grooves and firmly lock the bushing against rotation. It will readily be appreciated that in the absence of these grooves a small bushing tends to rotate within the bore and is soon cut by the surrounding bore walls.

These and other objects and advantages of the present invention will be more readily apparent from a consideration of the following detailed description of the drawings illustrating preferred embodiments of the invention.

Figure 1:
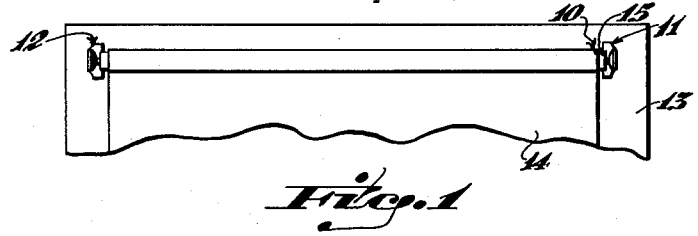
FIGURE 1 is a partial elevational view of a window shade, roller, and bracket constructed in accordance with the present invention.

One preferred form of window shade roller and bracket constructed in accordance with the present invention is shown in FIGURE 1. As there shown, a window shade roller 10 is supported by two spaced brackets 11 and 12 mounted at the top of a window frame 13 as by means of conventional wood screws (not shown). Roller 10 carries a window shade 14 in the form of a rectangular sheet of paper or cloth of the quality commonly employed for shade material. The upper edge of shade 14 is attached to the shade roller in any suitable manner so that the roller is adapted to constitute a reel for the shade.

Roller 10 is preferably formed of wood or sheet metal and has a central bore adapted to receive a conventional spring winding mechanism (not shown) such as that disclosed in Morpeth Patent No. 2,427,298. The details of this spring mechanism constitutes no part of the present invention; it will suffice here to state that one end of the roller is provided with a flat spear which fits in a slot and is held stationary within bracket 12. This spear is in turn joined to a hub member which rotatably supports the left end of the roller as viewed in FIGURE 1.

Figure 2:
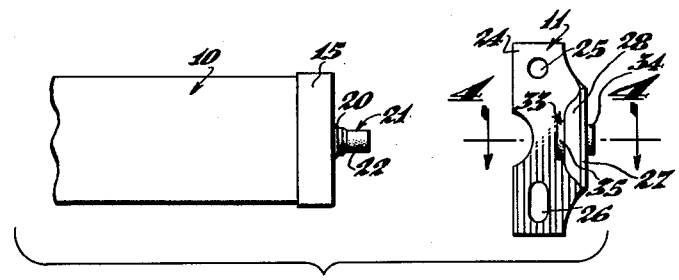
FIGURE 2 is an enlarged elevational view of one preferred form of roller and bracket of the present invention.
Figure 3:
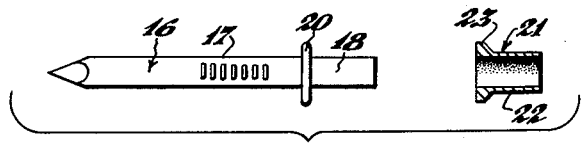
FIGURE 3 is an enlarged elevational view of a gudgeon and nylon sleeve, the sleeve being shown in cross section.

The other end of the roller carries a cap or ferrule 15. A gudgeon 16 is driven into the end of the wooden roller through an opening in this cap. Gudgeon 16, as best shown in FIGURE 3, includes a nail portion 17, and a cylindrical pivot pin portion 18 which are separated by an annular head 20. A nylon bearing sleeve 21 is press fitted over the pin portion 18 of the gudgeon to provide a nylon bearing surface. As shown in FIGURE 3, nylon sleeve 21 includes a generally tubular sleeve portion 22 and an outwardly extending flange or lip 23. The outer diameter of this lip is preferably the same as the outer diameter of head 20 so that the lip substantially covers the head as shown in FIGURE 2. The length of the tubular portion 22 is such that the nylon sleeve extends the whole length of pin section 18 of the gudgeon.

Figure 4:
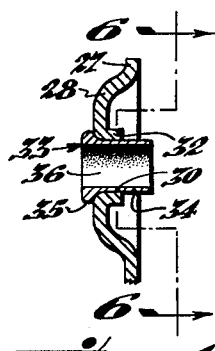
FIGURE 4 is a cross sectional view taken along line 4—4 of FIGURE 2.
Figure 6:
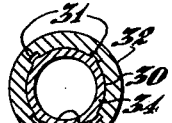
FIGURE 6 is a cross sectional view taken along line 6—6 of FIGURE 4.

Gudgeon pin 18 is rotatably supported within bracket 11. Bracket 11 is preferably stamped from sheet metal and includes a mounting flange 24 having suitable openings 25 and 26 for receiving screws by means of which the bracket is attached to a wall and an outwardly extending arm 27. Arm 27 preferably includes a substantially cup shaped portion 28 having a circular bore 30 formed therein. In accordance with the present invention this bore is formed by means of a pressing punch having a plurality of narrow longitudinal grooves which form a like plurality of grooves 31 in the periphery of the bore. As best shown in FIGURE 4, when the bore is punched in this manner, a cylindrical shoulder 32 is formed surrounding the bore, the grooves approximately .01 inch deep and .025 inch wide, extending longitudinally of the shoulder.

A nylon bushing 33 is press fitted within bore 30, the nylon bushing being supported by shoulder 32. Bushing 33 includes a cylindrical portion 34 and an outwardly extending flange, or lip 35, formed on one end. In a preferred embodiment this bushing is formed by injection molding and is press fitted in the bore 30 formed in bracket arm 27. The grooves 31 formed by the grooved punch provide spaces into which portions of the nylon bushing can expand. The nylon bushing is thus held firmly against rotation within the bracket even though the dimensions of the bushing may vary slightly because of molding inaccuracy.

The outer diameter of lip 35 is preferably slightly greater than the outer diameter of flange 23, on sleeve 21. When the roller is inserted in the bracket, the cylindrical portion 22 of sleeve 21 rotates within the cylindrical bore 36 formed in bushing 33. Additionally, when a sideways thrust is applied to the shade as when it is being raised or lowered, lip 23 on sleeve 21 and lip 35 of bushing 33 are brought into facial abutment. Thus, nylon members 21 and 33 function both as pivot bearings and as thrust bearings; and there is no metal to metal contact possible so that a smooth quiet bearing is provided.

Figure 5:
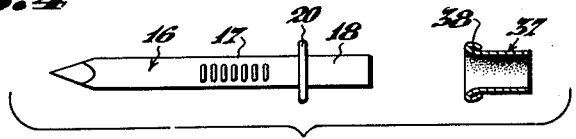
FIGURE 5 is an enlarged elevational view similar to FIGURE 3 of a gudgeon pin and a modified form of sleeve.

A modification of sleeve 23 is shown in FIGURE 5. As there shown, sleeve 37 is formed from an extruded tubular piece of nylon having a rolled over collar 38 formed on one end. This collar, or lip 38 is preferably of the same outer diameter as head 20 and functions to act as a thrust bearing in the same way as lip 23 of the first embodiment. It is to be understood that sleeve 37 is press fitted over pin end 18 of gudgeon 16 and is adapted to be received within a nylon bushing 33 in the manner described above.

Figure 7:
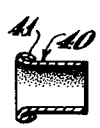
FIGURE 7 is a cross sectional view through a modified bushing.

A modified form of bushing is shown in FIGURE 7. Modified bushing 40 is formed from an extruded length of nylon tubing. One end of the bushing has an overturned collar or flanged portion 41 formed thereon. Bushing 40 is adapted to be inserted in a bracket 11 in exactly the same manner as bushing 33. Also, the cylindrical bore in bushing 40 is adapted to receive a gudgeon pin sleeve and function as a pivot bearing therefor; and the collar, or flange, 41 is adapted to engage the lip on such a sleeve to form a thrust bearing in the manner explained above.

From the foregoing disclosure of the general principles of the present invention and the detailed description of preferred embodiments, those skilled in the art will readily comprehend various modifications to which the invention is susceptible. For example, a nylon bushing can be inserted in the bore of a bracket other than the specific bracket shown, for example, a bracket having flanges adapted to abut the end walls of a window opening. Also while as explained above, the best results are obtained from a combined nylon bushing and sleeve, definitely improved results are provided by the use of either a bushing or sleeve independently. Thus in some installations, it may be desired to replace the old all metal brackets with brackets having nylon bushings, without at the same time providing new rollers having nylon sleeves formed on the gudgeon pin. This may be done and the metal gudgeon pins will be received in the nylon bushings and will rotate more freely and with less noise than in the old style metal brackets. Similarly, in some installations it may be desired to replace the rollers or the gudgeon pins without replacing the old metal brackets. In such a case, the nylon sleeves on the new gudgeon pins will be received in the metal brackets and will rotate with less noise and friction than when metal gudgeon pins were employed.

Having described my invention, I claim:

1. The combination of a bracket comprising a mounting flange adapted to abut a wall, an arm extending outwardly from said flange, said arm having a bore formed therein, a nylon bushing disposed within said bore, said nylon bushing comprising a tubular portion and a radially extending lip formed on one end of said tubular portion, a shade roller, a gudgeon pin extending outwardly from one end of said shade roller, a nylon sleeve member mounted over said pin, said nylon sleeve member including a tubular portion and a lip, the tubular portion of said nylon sleeve being received within said nylon bushing to provide a pivot bearing, the lip of said sleeve being disposed for engagement with the lip on said bushing to form a thrust bearing.

2. The combination of a bracket comprising a mounting flange adapted to abut a wall, an arm extending outwardly from said flange, said arm having a bore formed therein, a nylon bushing disposed within said bore, said nylon bushing comprising a tubular portion and a radially extending lip formed on one end of said tubular portion, a shade roller, a gudgeon extending outwardly from one end of shade roller, said gudgeon including a cylindrical pin portion and an annular head, a nylon sleeve member mounted over said gudgeon, said nylon sleeve member including a tubular portion surrounding the pin portion of said gudgeon, and a lip disposed over said annular head, the tubular portion of the sleeve being received within said bushing to provide a pivot bearing, the lip of said sleeve being disposed for engagement with the lip on said bushing to form a thrust bearing.

3. The combination of a bracket comprising a mounting flange adapted to abut a wall, an arm extending outwardly from said flange said arm having a bore formed therein, a shoulder surrounding said bore and having a plurality of longitudinal grooves formed therein, a nylon bushing press fit within said bore, said nylon bushing comprising a tubular portion and a radially extending lip formed on one end of said tubular portion, a shade roller, a gudgeon extending outwardly from one end of shade roller, said gudgeon including an annular head and a cylindrical pin portion, a nylon sleeve member mounted over said gudgeon, said nylon sleeve member including a tubular portion and an enlarged portion at one end of said tubular portion, the tubular portion of said sleeve being received within said bushing to provide a pivot bearing, the enlarged portion of said sleeve being disposed for engagement with the lip on said bushing to form a thrust bearing.

4. The combination of a bracket comprising a mounting flange adapted to abut a wall, an arm extending outwardly from said flange, said arm having a bore formed therein, said bore being of generally circular configuration and having a plurality of longitudinal grooves formed therein, a nylon bushing disposed within said bore, said nylon bushing comprising a tubular portion in engagement with the grooves of said bore and a radially extending lip formed on one end of said tubular portion, a shade roller, a gudgeon extending outwardly from one end of said shade roller, said gudgeon including a cylindrical pin portion and an annular head, a nylon sleeve member mounted over said gudgeon, said nylon sleeve member including a tubular portion surrounding the pin portion of said gudgeon, and a lip disposed over said annular head, the tubular portion of the sleeve being received within said bushing to provide a pivot bearing, the lip of said sleeve being disposed for engagement with the lip on said bushing to form a thrust bearing.

References Cited in the file of this patent

UNITED STATES PATENTS

| | | |
|---|---|---|
| 823,452 | Vickery | June 12, 1906 |
| 1,166,683 | Hill | Jan. 4, 1916 |
| 2,644,199 | Miller | July 7, 1953 |
| 2,724,867 | Smith | Nov. 29, 1955 |